United States Patent [19]

Sidana

[11] Patent Number: 5,890,170
[45] Date of Patent: Mar. 30, 1999

[54] METHOD AND APPARATUS FOR PUBLISHING DOCUMENTS IN A HYPERTEXTURAL NETWORK ENVIRONMENT

[75] Inventor: Ashmeet S. Sidana, Mountain View, Calif.

[73] Assignee: Silicon Graphics, Inc., Mountain View, Calif.

[21] Appl. No.: 608,111

[22] Filed: Feb. 28, 1996

[51] Int. Cl.[6] .................................................. G06T 11/00
[52] U.S. Cl. ............................................................ 707/501
[58] Field of Search ................................... 395/761–763, 395/774–778, 288, 326, 356, 357; 345/326, 356, 357; 707/500, 501, 513, 530

[56] References Cited

U.S. PATENT DOCUMENTS

| 5,479,599 | 12/1995 | Rockwell et al. | 395/357 |
|---|---|---|---|
| 5,481,666 | 1/1996 | Nguyen et al. | 395/357 |
| 5,546,519 | 8/1996 | Berry | 395/326 |
| 5,572,643 | 11/1996 | Judson | 395/762 |
| 5,649,186 | 7/1997 | Ferguson | 707/10 |

OTHER PUBLICATIONS

Net. Genesis et al., "Build a Web Site" by Prima Publishing, (1995), pp. 132–136.

Rick Ayre et al., "The Internet Means Business" by PC Magazine, (May 16, 1995), pp. 195–197, 200–201.

Sean Gonzalez, "Building a Web Presence" by PC Magazine, (May 16, 1995), pp. 205, 208, 213–216, 220.

Kevin Reichard, "Will Your Business Be Safe?" by PC Magazine, (May 16, 1995), p. 218.

Jill H. Ellsworth, "Three Routes to a Web Presence" by PC Magazine, (May 16, 1995), p. 224.

Ben Gottesman et al., "Lotus Ties Notes to the Internet" by PC Magazine, (May 16, 1995), p. 228.

Kevin Reichard, "Letting Customers Dig Through Your Data" by PC Magazine, (May 16, 1995), pp. 233, 236.

Rick Ayre et al., "What's Next for Servers?" by PC Magazine, (May 16, 1995), pp. 237, 239.

Kevin Reichard "Leveraging E–Mail" by PC Magazine, (May 16, 1995), pp. 241, 244, 245.

Standards Documentation Persistent Client State HTTP Cookies, Preliminary Specification, Netscape Communications Corp., copyright ©1995.

Netscape Navigator SmartMarks Data Sheet, Netscape Communications Corp., copyright ©1995.

"Hotmetal Pro 2.0 wins PC Magazines's Editor's Choice Award", Sep. 18, 1995.

PC World "Herpes How to Do Business on the Web", Mar. 1995.

PC Magazine "Publish to the Web", 1995.

Kleper "HTML Markdown", Sep. 26, 1995.

*Primary Examiner*—Almis R. Jankus
*Attorney, Agent, or Firm*—Graham & James LLP

[57] ABSTRACT

A method, apparatus and system for allowing a user to create and add information to his World Wide Web home page, or a private home page. In the present invention, a user drags and drops icons representing the information that should be included in the user's home page. The present invention creates links in the user's home page to the information (or to a copy of the information). The organization of the home page remains completely transparent to the user.

20 Claims, 15 Drawing Sheets

Initialization

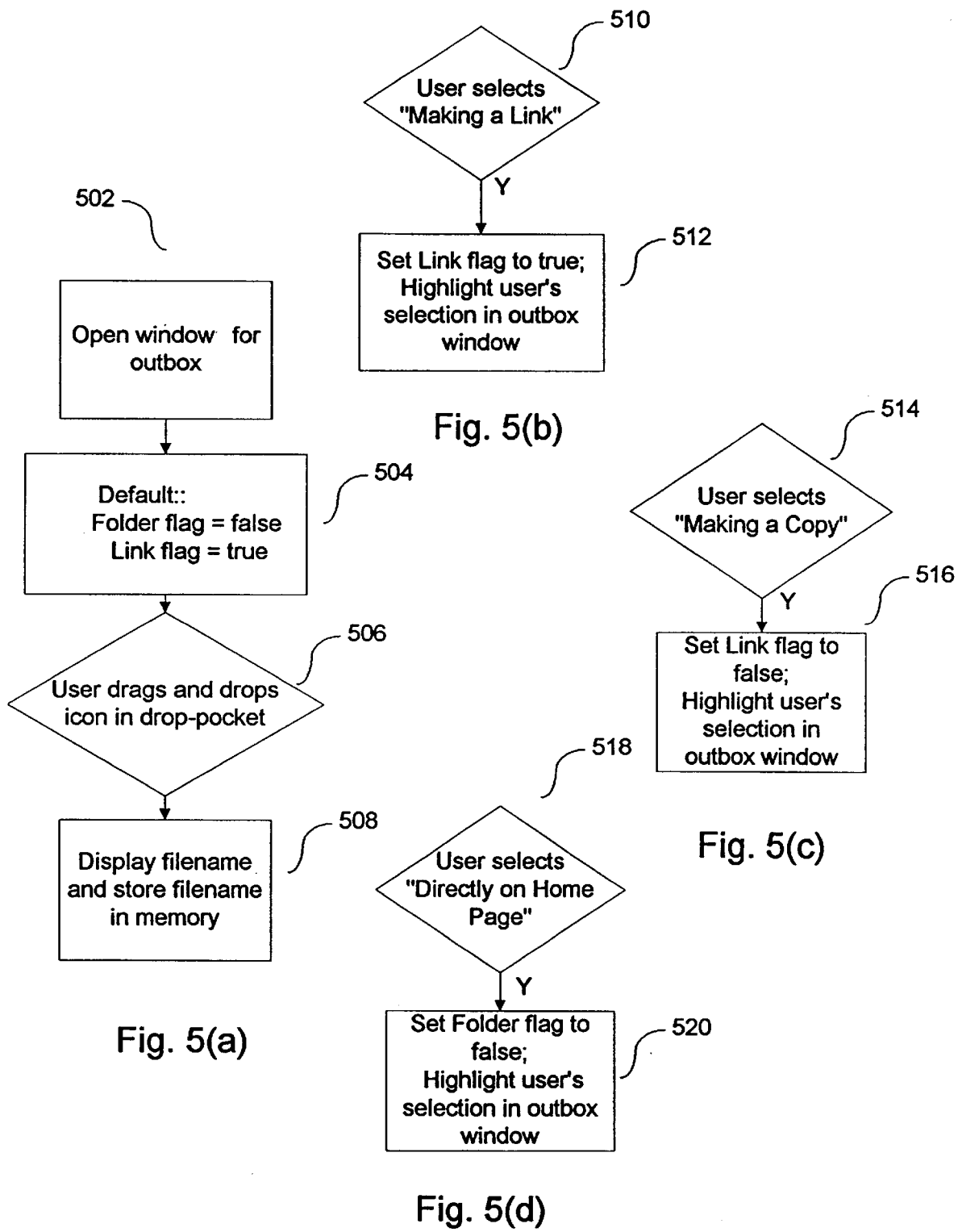

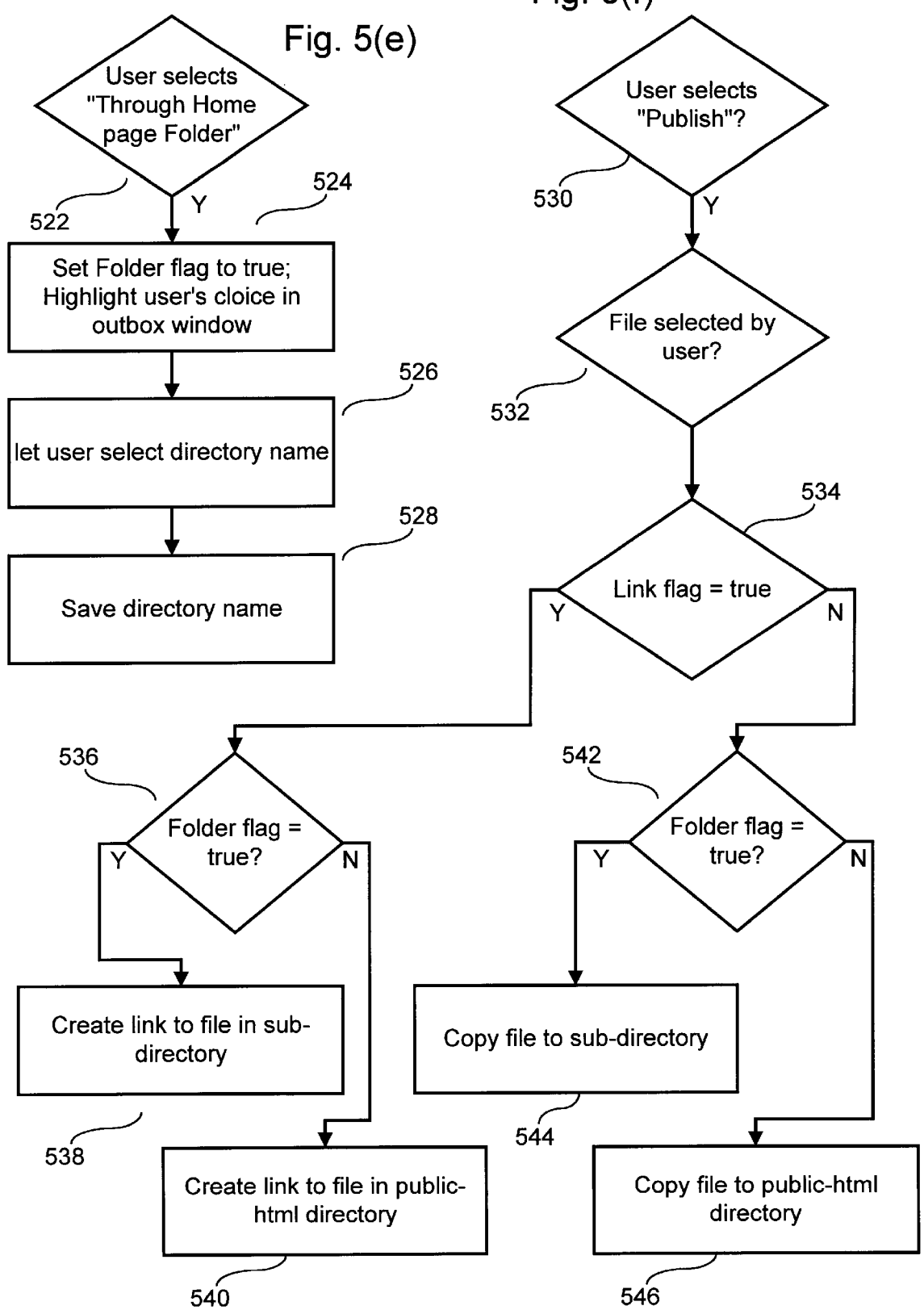

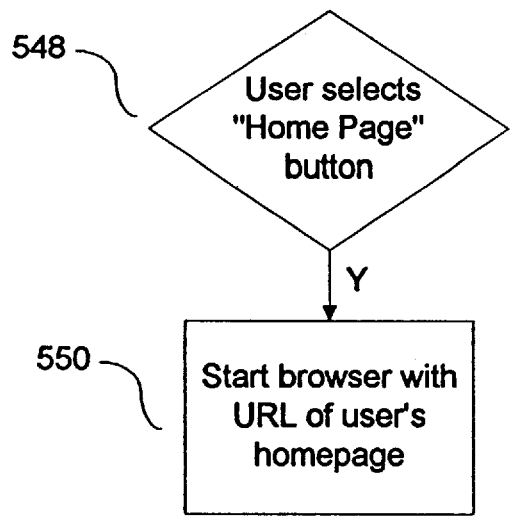
Fig. 5(g)
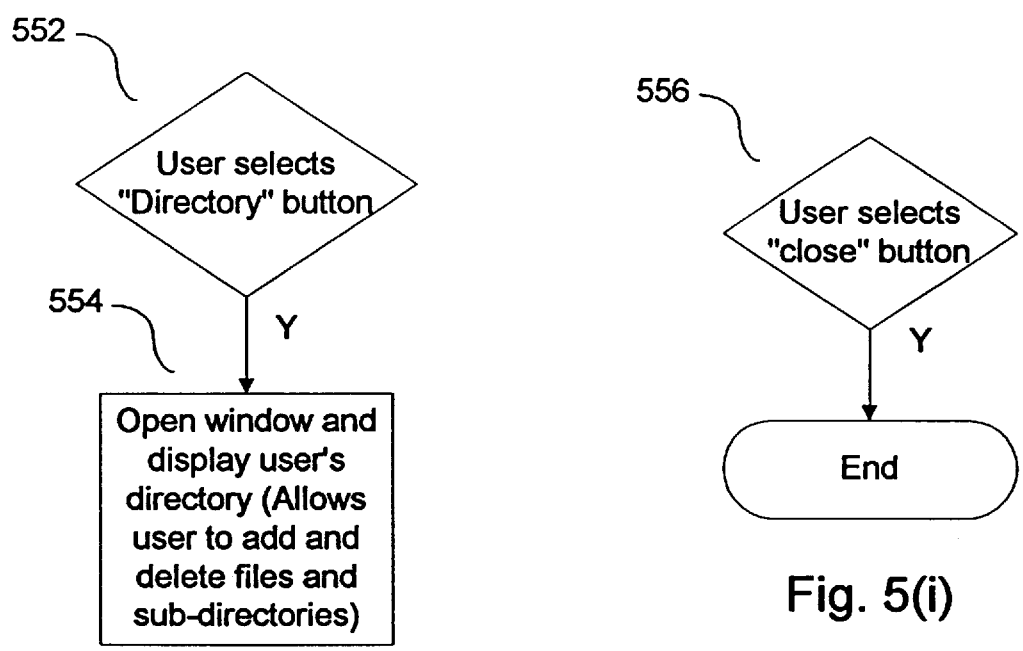
Fig. 5(h)
Fig. 5(i)

Exemplary Memory Contents

METHOD AND APPARATUS FOR PUBLISHING DOCUMENTS IN A HYPERTEXTURAL NETWORK ENVIRONMENT

APPENDIX

This application contains a single microfiche appendix comprising 18 frames of Common Gateway Interface ("CGI") scripts entitled "APPENDIX A" and referred to hereafter as "Appendix A".

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This application relates to the electronic publishing of documents and, more particularly, to the creation of documents on the World Wide Web.

The now-famous World Wide Web ("the Web") is built around a network of "server" computers which exchange requests and data from each other using the hypertext transfer protocol ("http"). Using any of the numerous, commercially available "browser" programs, a user who establishes a communications link with any Web server of the network can access documents available from other Web servers on the network by submitting an appropriate http request. A typical http request will reference a document by its unique Uniform Resource Locator ("URL"). A document's URL includes an identification of the Web server hosting that document, so that an http request for access to the document can be routed to the appropriate Web server for handling. Web documents can also be linked graphically to each other.

The user of a "browser" program can simply "point and click" on a graphical hypertext link displayed in one accessed document. The point and click action will result in the browser or its associated server transmitting an http request containing the URL of the desired document over the Web. As a result, a new document will be displayed. Thus, the user can easily "browse" through an almost infinite number of linked documents, using only the point and click action of a mouse.

In light of the remarkable and growing popularity of the Web among millions of users, an important challenge for technologists is to provide convenient, computer-based tools to assist users in the process of "publishing" (making available) their own content on the Web.

In order to publish a document on the Web, several things must be taken care of. First, a Web document's internal contents must conform to certain standard formats that are uniformly intelligible to the servers and browsers of the Web. Thus, on the Web, document contents are typically formatted in ASCII text, augmented by code in hypertext mark-up language ("html") specifying graphical layout information such as the previously mentioned graphical, hypertextual links to related documents on the Web.

Another requirement, of course, is that the document be made available to a local Web server, i.e., the document must be stored in a file system to which a Web server has access. In addition, as a practical matter, it is important to integrate newly published materials into the hypertextual organization of the Web. For example, so-called "home page" documents are commonly provided on Web Servers. Home pages are akin to tables of contents or road maps, and offer information and hypertext links referencing more specific materials that are available on the home page server or elsewhere around the Web. By browsing or "visiting" home pages of interest, users of the Web can more readily identify what specific documents may be of interest to them. As new materials are published to the Web, hypertext references to the new materials should therefore be integrated into appropriate home pages.

In the Web's early days, relatively little help for Web publishing was available to ordinary users. Web publishing therefore remained the exclusive province of sophisticated Web enthusiasts and their clients. More recently, however, a number of computer-based tools to assist in the publishing process have begun to emerge. "Authoring" tools are available that assist users in constructing or converting their documents into proper html format for the Web. Other tools offer some help in completing the publishing process by copying documents into a Web server file system. For example, see PC Magazine, May 16, 1995, pp. 195–245, and pp. 205–224.

The currently available crop of tools falls short from the vantage point of naive users. Prior art tools generally impose a relatively steep, initial learning curve in which naive users must master complex, new techniques and concepts. What is truly desired is a computer-based Web publishing tool that leverages the basic user interface concepts and metaphors that are already familiar to a typical naive user. Ideally, publishing a document on the Web should be an immediately intuitive process for the user who already knows enough about personal computers to create electronic documents, and to manipulate documents by "dragging and dropping" document icons using a standard graphical user interface such as Microsoft Windows or Apple Macintosh OS, but who does not necessarily know much else about computer and network technologies.

Because of the truly explosive growth of interest in the Web among just such users, the importance of suitably intuitive tools to serve this niche of users is clear. A solution to this challenge will be equally valuable in the context of "private webs" in large organizations, i.e., secure networks that support http but that are not necessarily accessible publicly through the Internet.

SUMMARY OF THE INVENTION

The present invention overcomes the problems and disadvantages of the prior art by disguising the organization and implementation of a home page from the home page "owner" who must create and manage a home page. The present invention allows such a home page owner to add information to his World Wide Web home page (or private home page) by dragging and dropping icons representing the information the owner wants to be accessible through the home page. The present invention creates both a basic home page and the links in the home page to the information (or to a copy of the information). The organization of the home page remains completely transparent to the owner.

In accordance with the purpose of the invention, as embodied and broadly described herein, the invention relates to a method for electronically publishing one or more documents in an http network environment, said network environment comprising a plurality of http servers, said method comprising the following steps: generating a home page document template in a file system of an http server;

interactively dragging and dropping file icons representing the one or more documents onto one or more other icons representing a request to publish; and automatically including graphical hypertextual links to the one or more documents in the home page document template, in response to the interactive dragging and dropping step and without requiring further interactive control by the user, thereby electronically publishing the one or more documents.

In further accordance with a purpose of this invention, as embodied and broadly described herein, the invention may include a computer system or network of computer systems comprising one or more interconnected CPU's, computer memories and interactive input/output devices. Computer software processes executing at one or more locations throughout the computer system include a browser, a Web server and a Web publishing application program operatively coupled to and/or operating on various directories, an HTML home page template and scripts, such as CGI scripts, so as to enable a Web publishing application user to publish documents on a home page over the World Wide Web in the manner described herein.

Objects and advantages of the invention will be set forth in part in the description which follows and in part will be obvious from the description or may be learned by practice of the invention. The objects and advantages of the invention will be realized and attained by means of the elements, method steps and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 5(a) through 5(i) are flow charts showing steps performed during operation of the outbox software.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
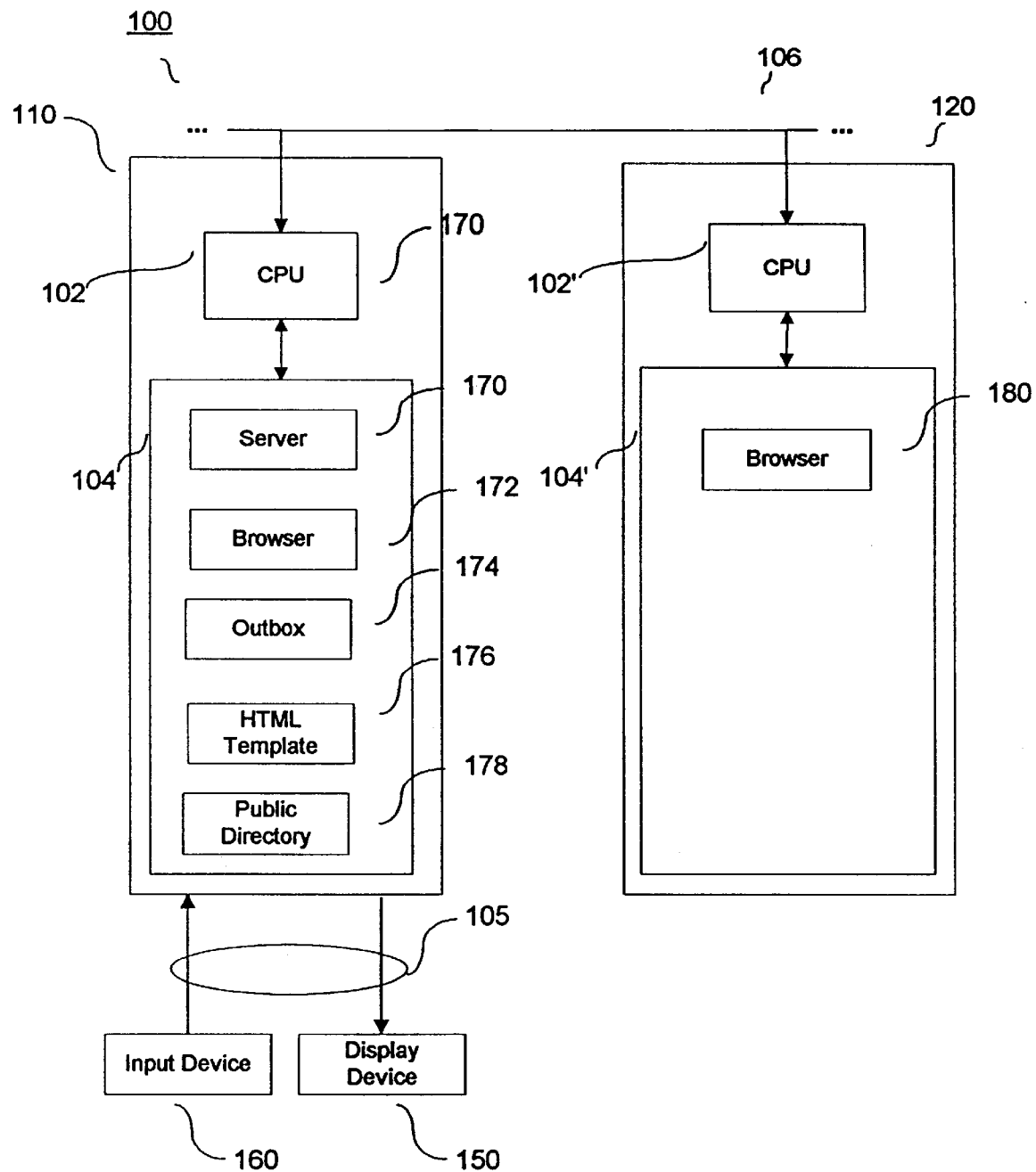
FIG. 1 is a block diagram of a computer system in accordance a preferred embodiment of the present invention.

FIG. 1 is a block diagram of a computer system 100 in accordance with a preferred embodiment of the present invention. Computer system 100 includes a first computer 110 and a second computer 120. The first and second computers are connected by network connections 106, such as internet connections or the connections of a LAN.

Each computer 110, 120 includes a CPU 102, 102' and a memory 104, 104'. First computer 110 also includes input/output lines 105, connected to a display device 150 and an input device 160. Display device 150 is, for example, a display terminal and input device 160 is, for example, a keyboard or a mouse. It will be understood by persons of ordinary skill in the art that computer system 100 can also include numerous elements not shown in FIG. 1 for the sake of clarity, such as disk drives, additional keyboards, additional output lines, additional display devices, additional network connections, additional memory, additional CPUs, etc.

Memory 104 of first computer 110 includes a computer program called a "browser" 172, a computer program called a "server" 170, a computer program 174 for publishing documents called "outbox", HTML template data 176 for a user's home page, and a directory of public information 178, as will be described below. Memory 104' of second computer 120 includes a browser 180. A person of ordinary skill in the art will understand that memories 104, 104' may also contain additional information, such as application programs, network communication programs (e.g., the TCP/IP protocol suite), operating systems, data, etc., which are not shown in the figure for the sake of clarity. A preferred embodiment of the present invention executes under the "IRIX" operating system, available from Silicon Graphics, Inc. of Mountain View, Calif. "IRIX" is a trademark of Silicon Graphics, Inc. The present invention preferably uses the XFS or EFS file system and the Motif/XWindow windowing system. It will be understood that, although two separate computers are shown, the present invention can also be implemented so that the browser, server, and outbox are all running on the same computer or on some combination of multiple computers.

Figure 2:
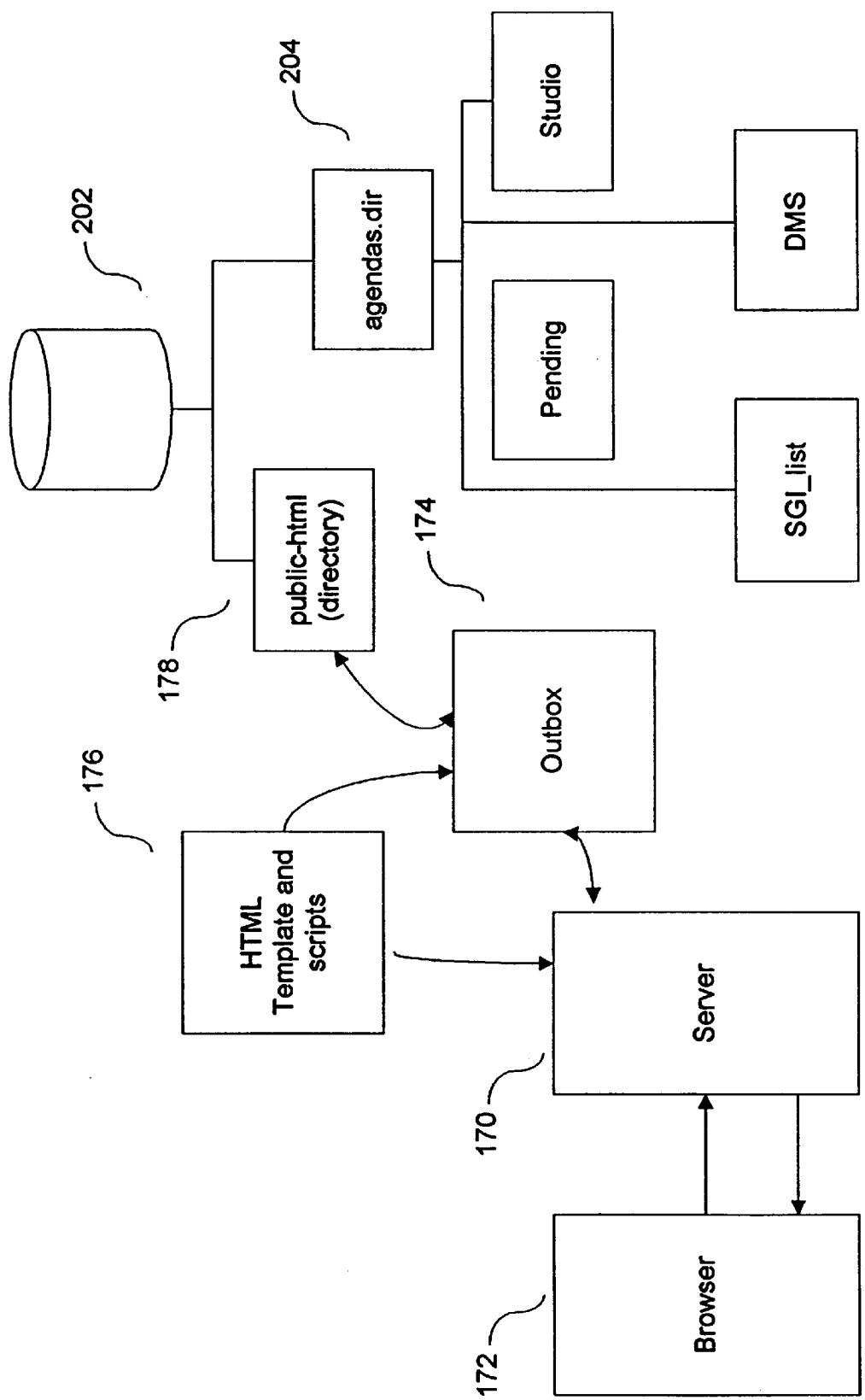
FIG. 2 is a block diagram illustrating a relationship between a browser, a server, outbox software, and a public directory, all executing and/or stored on a computer system in accordance with a preferred embodiment of the present invention.

As discussed above, the present invention allows a user (i.e., a home page "owner") to add information to his home page, while keeping the organization of the home page transparent to that owner. FIG. 2 is a block diagram of a relationship between a browser 172, a server 170, outbox document publishing software 174, an HTML template and scripts 176, and public directory 178 in accordance with a preferred embodiment of the present invention. Upon initialization, outbox software 174 creates public directory 178. During operation, outbox 174 also may add to a public directory (e.g., public-html) 178. Server 170 uses HTML template 176 and CGI scripts, in conjunction with public directory 178, to generate HTML to send to the browser, as will be described below.

When a person desires to view a home page, the person uses a browser, as is known to persons of ordinary skill in the art. As is discussed below in connection with FIG. 6, server 170 communicates with a browser, such as browser 172, and the browser displays the user's home page in accordance with the HTML.

Figure 3:
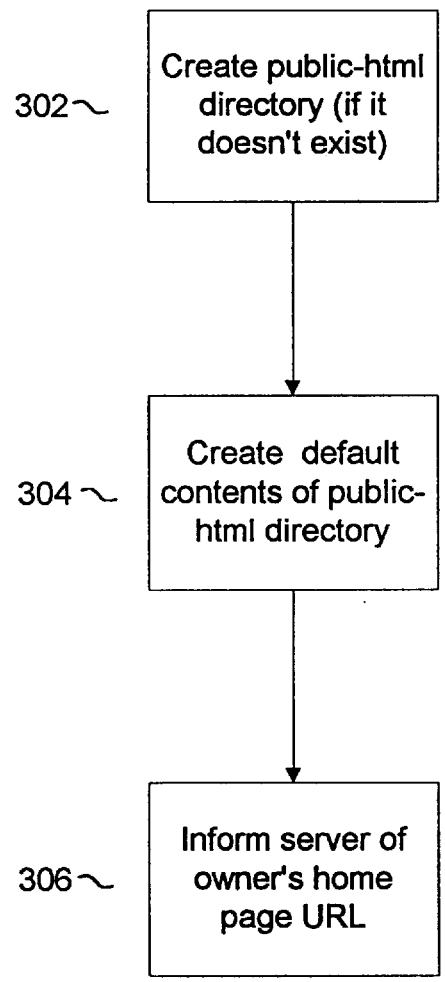
FIG. 3 is a flow chart showing steps performed during initial operation of the outbox software.

FIG. 3 is a flow chart showing steps performed during initial operation of outbox software 174. The steps of FIG. 3 are performed only once as part of the outbox initialization process. For example, the steps can be performed during a first time that a user logs into computer system 100 or the first time the outbox program is executed. The steps of FIG. 3 are implemented by CPU 102 performing computer instructions stored in a memory.

In step 302, the CPU creates a public directory 178 having a predetermined name (such as "public-html") if such a directory does not already exist. This directory will hold either files or links to files containing information that the user wishes to place on his home page. The CGI scripts that describe how the server should create HTML for a home page are installed on the server in a separate file. In step 304, the CPU preferably creates default files in public directory 178. In a preferred embodiment, the files created are: a GIF format graphic that is a picture of the owner of the home page (if available) and HTML template 176 of the home page through which the owner's documents will be published. The information in these files is created for every home page in the described embodiment. A home page owner may choose to edit his home page further using available home page editor software, such as "Web Magic" editing software from Silicon Graphics, Inc. Web Magic is a trademark of Silicon Graphics, Inc. of Mountain View, Calif. Sub-directories are also preferably created by the outbox software and placed in public directory 178. These sub-directories are initially empty. The utility of the subdirectories is discussed below. In step 306, the CPU creates a link from server 170 to the home page owner's home page, so that the server becomes aware of the existence of the home page and can provide the home page HTML upon requests from browsers.

Figure 4:
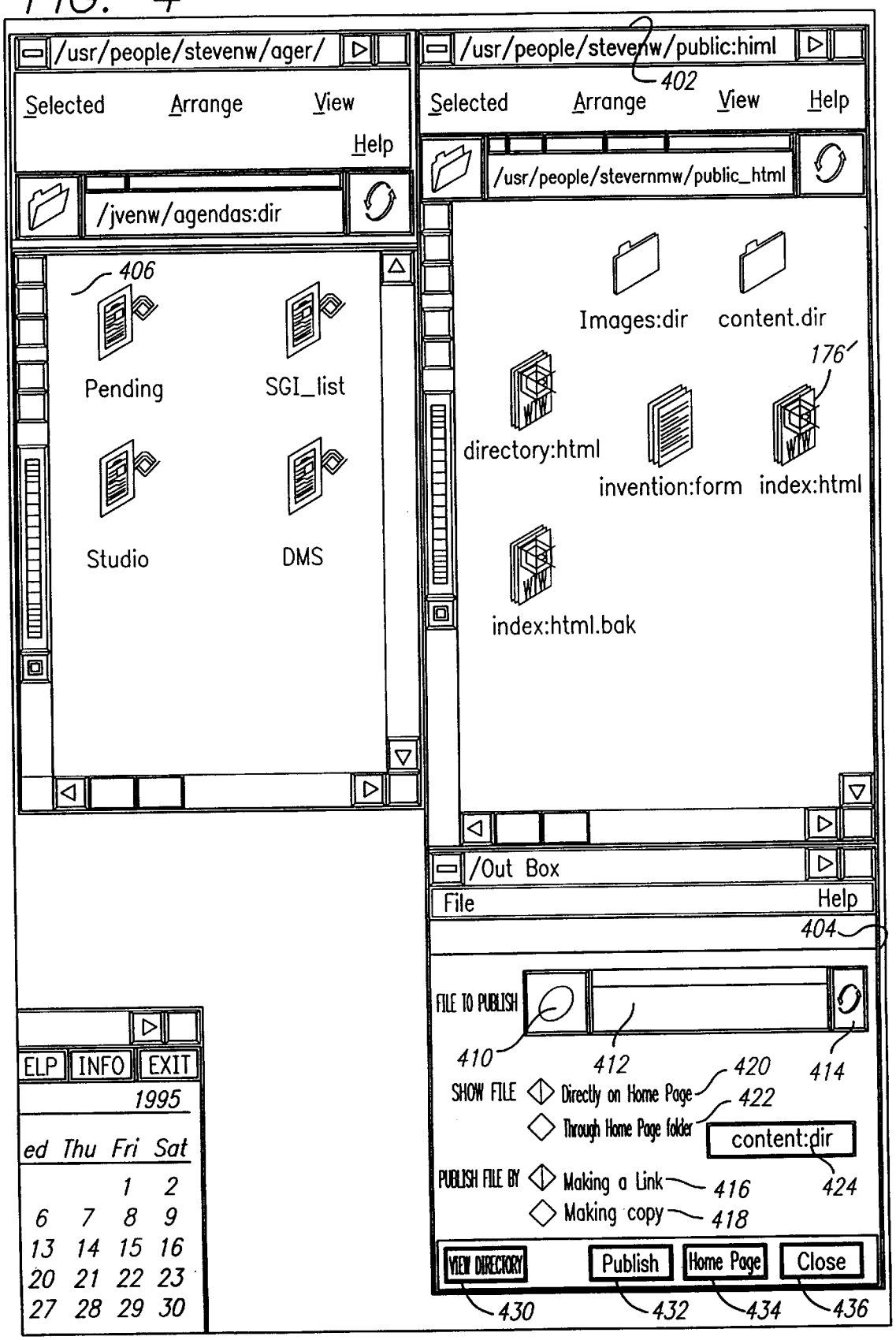
FIG. 4 shows a plurality of windows displayed during the operation of the outbox software.

FIG. 4 shows a plurality of windows that may be displayed during the operation of outbox software 174, after initialization has occurred. FIGS. 5(a) through 5(i) are flow charts showing steps performed during operation of outbox software 174. As shown in FIG. 5(a), when a beginning step 502 of outbox software 174 is executed, window 404 of FIG. 4 is opened on the output device. Window 404 allows the user to "publish" files, as discussed in detail below. Window 402, which may be opened by selecting the View Directory button, 430, contains icons representing the contents of public file 178. For the purposes of example, FIG. 4 also shows a window 406 that contains icons representing the contents of a directory 204. In the example, the owner of the home page opened this window 406 using methods which are well known to those in the relevant field. Returning to FIG. 5(a), in step 504, the CPU sets default values for two flags. A "Folder flag" is set to false and a "link flag" is set to true. Both flags are discussed below in connection with FIG. 5(f).

Figure 8:
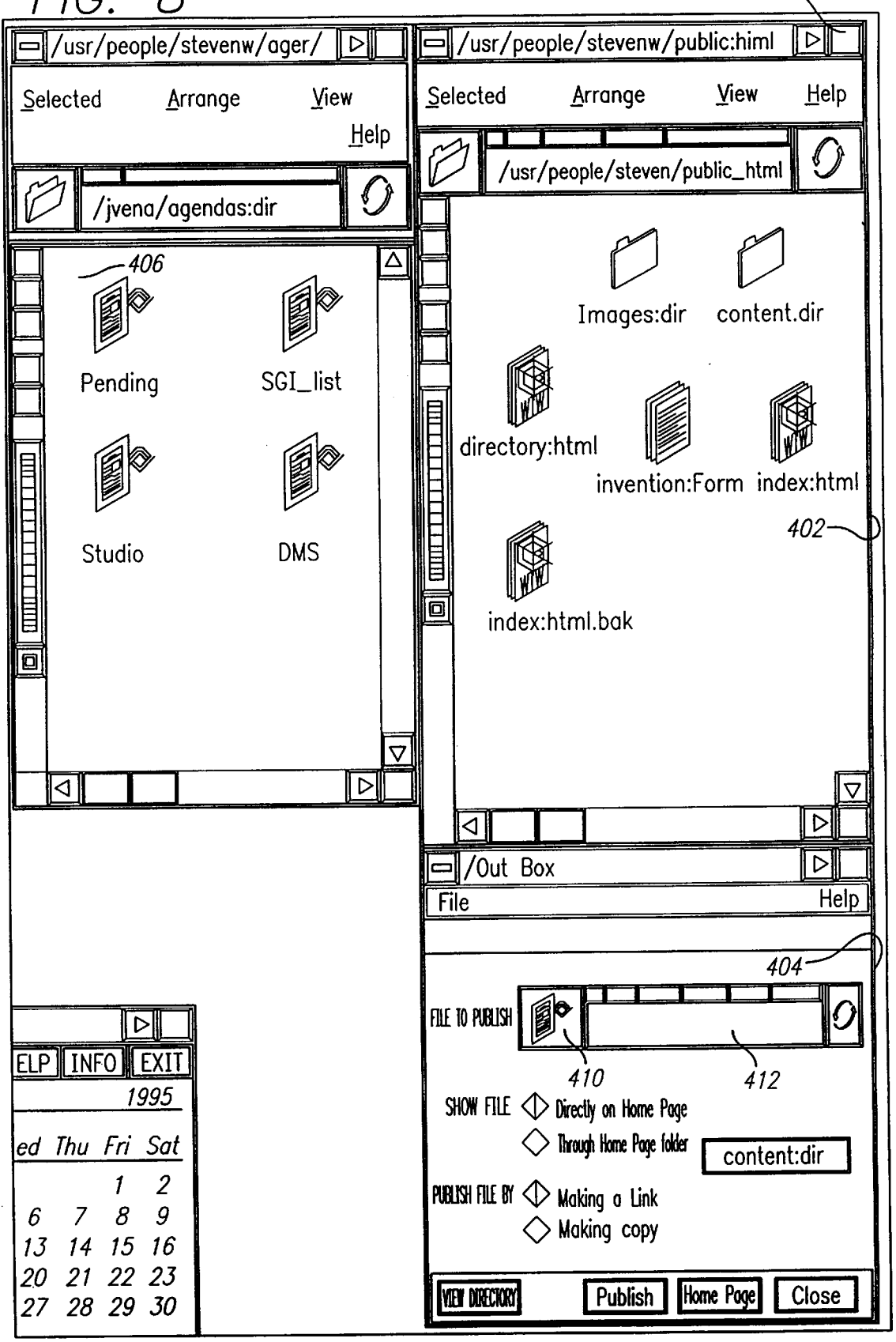
FIG. 8 shows a plurality of windows displayed during the operation of the outbox software, prior to the addition of information to the home page of FIG. 7.

When outbox is initialized in FIG. 3, the files initially in public directory 178 will become part of the user's home page as discussed below. FIG. 4 shows a graphic area called a "drop-pocket" 410. The user adds additional information to his home page by dragging and dropping icons into "drop-pocket" 410 in step 506 (see FIG. 4) and by then publishing the information, as discussed below in connection with FIG. 5(f). When the user drags and drops an icon, the CPU displays the name of a file corresponding to the icon in area 412 (step 508). The filename is also stored in memory 104. An example of a drag and drop operation is shown in FIG. 8, in which an icon for a file "DMS" is dragged to drop-pocket 410. The complete path name of the file is displayed in area 412.

FIGS. 5(b)–5(e) show steps that are performed after a filename is displayed in area 412. In this discussion, the terms "directory" and "folder" are used interchangeably. FIG. 4 shows various options that the user can select for the filename in area 412. These options include: "Directly on Home Page" 420, "Through Home Page Folder" 422, "Making a link" 416, and "Making a copy" 418. FIG. 5(b) shows steps performed when the user selects "Making a link" 416. If this selection is made in step 510 then, in step 512, the Link flag is set to true and the selection is highlighted on the output device. If the link flag still holds its default value, then, of course, the link flag simply remains "true".

FIG. 5(c) shows steps performed when the user selects "Making a copy" 418. If this selection is made in step 514 then, in step 516, the Link flag is set to false and the selection is highlighted on the output device. Only one of options 416 and 418 may be selected at a time. If the user selects an option when the other option is highlighted, the highlighted option will be de-selected.

FIG. 5(d) shows steps performed when the user selects "Directly on Home Page" 420. If this selection is made in step 518 then, in step 520, the Folder flag is set to false (or remains false) and the selection is highlighted on the output device, as is shown in FIG. 8.

FIG. 5(e) shows steps performed when the user selects "Through Home Page folder" 422. If this selection is made in step 522 then, in step 524, the Folder flag is set to true and the selection is highlighted on the output device. The user then selects the sub-directory into which he wishes to place the file. In a preferred embodiment, the user presses "content dir" button 424 and is presented with a list of all sub-directories currently in pubic directory 178. The user must select one of these sub-directories (or "cancel"). In the described embodiment, the user must select from existing sub-directories. (The user can also create a new sub-directory in a manner known to persons of ordinary skill in the art, using the directory function initiated by "View directory" button 430 (see FIG. 4). FIG. 5(h) shows the steps performed when the user selects "View Directory" button 430. After the user selects a sub-directory name, in step 526 of FIG. 5(e), the name of the selected subdirectory is stored in memory in step 528. Only one of options 420 and 422 may be selected at a time. If the user selects an option when the other option is highlighted, the highlighted option will be de-selected.

FIG. 5(f) shows steps performed when the user selects "Publish" button 432. Such a selection means that the user wants to add information located in the file whose name is in area 412 to his home page. If this selection is made in step 530 and if a file has previously been selected (step 532), the CPU determines whether the Link flag is true in step 534. If the Link flag is true, control passes to step 536. Otherwise, control passes to step 542.

In step 536, it has previously been determined that the Link flag is true. If the Folder flag is true then, in step 538, the CPU creates a link to the selected file in the user selected sub-directory of public directory 178. The file manager of the described embodiment can make links to a file, using techniques known to persons of ordinary skill in the art and based upon the present disclosure. In step 536, if the Folder flag is false then, in step 540, the CPU creates a link to the file in public directory 178, using techniques known to persons of ordinary skill in the art and based upon the present disclosure.

In step 542, it has previously been determined that the Link flag is false. If the Folder flag is true then, in step 544, the CPU copies the selected file into the user-selected sub-directory of public directory 178. In step 542, if the Folder flag is false then, in step 546, the CPU copies the file into public directory 178.

Figure 9:
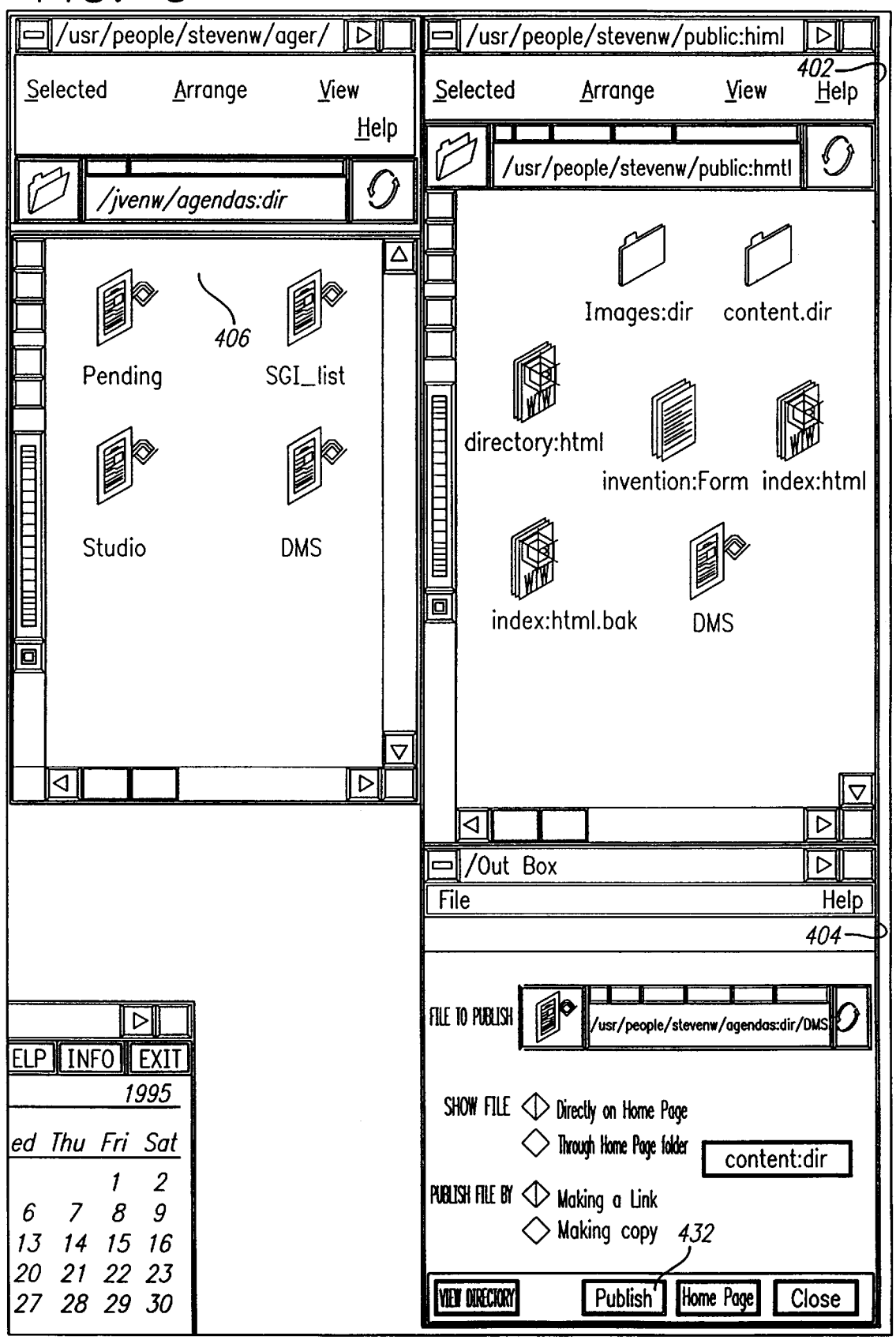
FIG. 9 shows a plurality of windows displayed during the operation of the outbox software, after the addition of information to the home page of FIG. 7.

As will be understood by persons of ordinary skill in the art, when a file (or a link) is added to a directory of a sub-directory, the operating system will automatically update window 402 so that an icon for a published file (or link) will automatically be displayed in window 402 after steps 538, 540, 544, and 546. FIG. 9 shows an example of the window of FIG. 8 after the user has pressed "Publish" button 402. As can be seen, an icon for the published user-selected file "DMS" appears in window 402.

Figure 6:
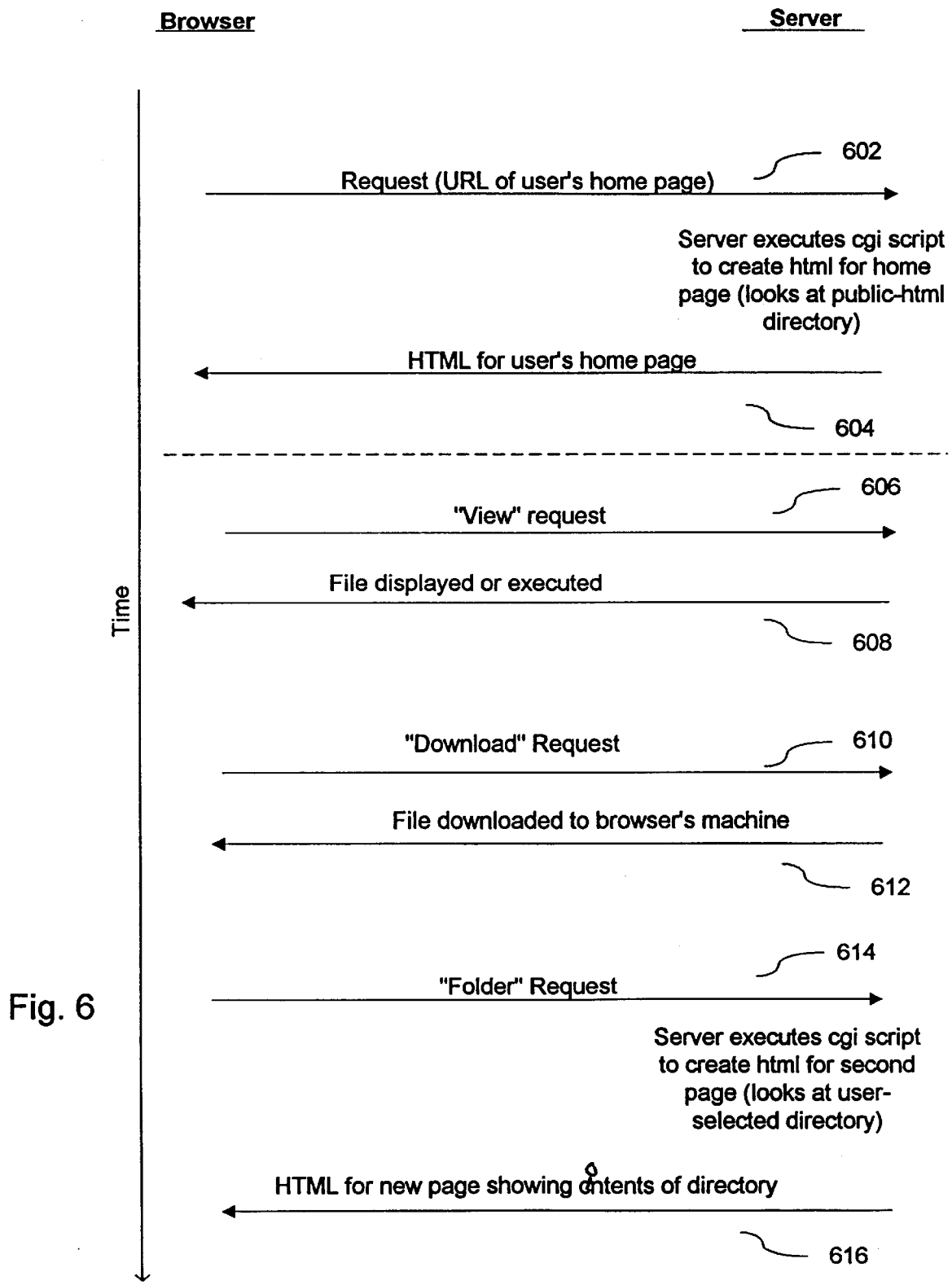
FIG. 6 is a diagram showing information passed between a browser and a server in order to enable the browser to display a user's home page.

FIG. 5(g) shows steps performed when the user, i.e., the owner of the home page, selects the "Home Page" button 434. If this selection is made in step 548 then, in step 550, the CPU starts browser 172 and sends it the URL of the user's home page. As a result, the browser displays the home page for its owner, with any newly added files or folders. Further details of these steps are shown in FIG. 6. As shown in FIG. 5(i), when the user selects "Close" button 436, execution of the outbox software terminates.

Thus, outbox software 174 allows the user to indicate a file containing information that he wishes to place on his home page. The outbox software places the file (or a link) in public directory 178 (or in a sub-directory of directory 178). As described below, server 170 uses public directory 178 to build the user's home page.

In a preferred embodiment, the user can also drag and drop an icon directly from window 406 into window 402. Such a drag and drop operation for an icon will cause the operating system to move the file from the directory (i.e., the agendas.dir directory, 204, in FIG. 2) corresponding to window 406 to public directory 178. This drag and drop operation has the same effect as if the user moved the icon to drop-pocket 410, used the default values of "Directly on Home Page," and selected "Publish" button 432. The user also may move a file into a sub-directory of public directory 178 by a drag and drop operation. In this case, the user drags a file icon from window 406 across to window 402 and drops the file icon on the selected folder (e.g., image.dir in FIG. 8). This drag and drop operation is interpreted by the operating system such that the drag and drop operation has the same effect as if the user moved the icon to drop-pocket 410, selected "Through Home Page folder", and selected "Publish" button 432. In a preferred embodiment, all files and directories in public directory 178 will appear on the user's home page.

FIG. 6 is a diagram showing information passed between a browser and server 170 in order to enable the browser to display the user's home page. First, the browser (e.g., browser 172 or browser 180) sends a request 602 to server 170 using the HTTP protocol. The request contains the URL of the user's home page. The server determines which home page is to be viewed and executes a CGI script to create HTML for the home page to be viewed. An example of a CGI script and the resulting HTML is contained in attached Appendix A, which is herein incorporated by reference. In step 604, server 170 sends HTML for the user's home page to the browser, which displays the document in accordance with the HTML.

Figure 7:
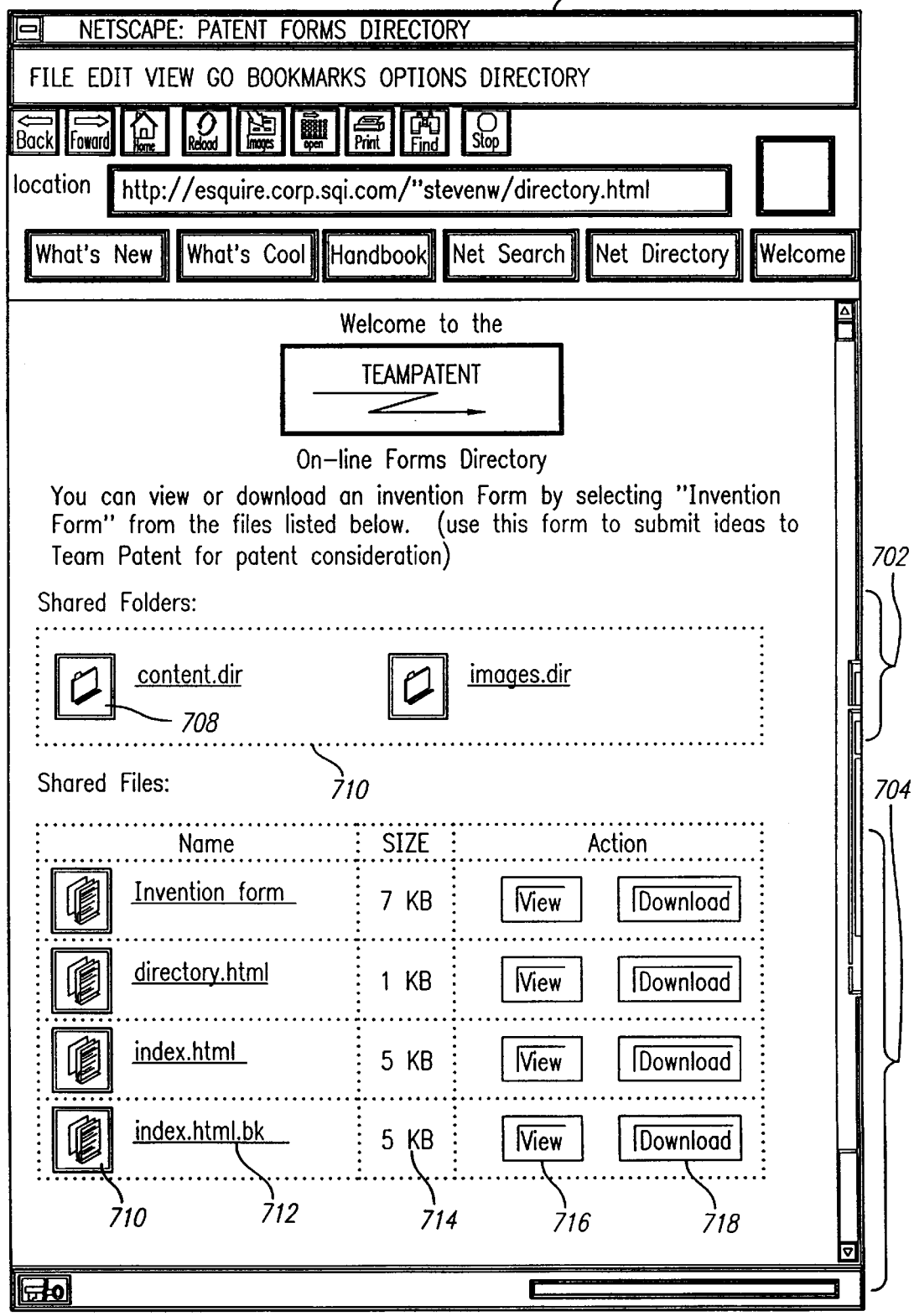
FIG. 7 shows a home page displayed in accordance with a preferred embodiment of the present invention.

FIG. 7 shows an example of a home page 700 displayed by browser 172. In the example, browser 172 is a Netscape browser, Version 1.1, available from Netscape Communications, Inc., of Mountain View, Calif., although any appropriate browser can be used. When server 170 creates HTML for page 700, it creates the HTML to generate areas 702 and 704 in accordance with the files in public directory 178 of FIG. 4. Thus, in FIG. 4, window 402 shows that public directory 178 contains four files (Invention Form, directory.html, index.html and index.html.bak) and two sub-directories (content.dir and images.dir). The HTML generated by server 170 for the user's home page reflects the contents of public directory 178. The two sub-directories are represented in area 702 of home page 700 and the four files are represented in area 704 of home page 700. Each sub-directory is represented as an icon 708 and a sub-directory name 710. Each file is represented as an icon 710, a filename 712, a size of the file 714, a "View" button 716, and a "Download" button 718.

Figure 10:
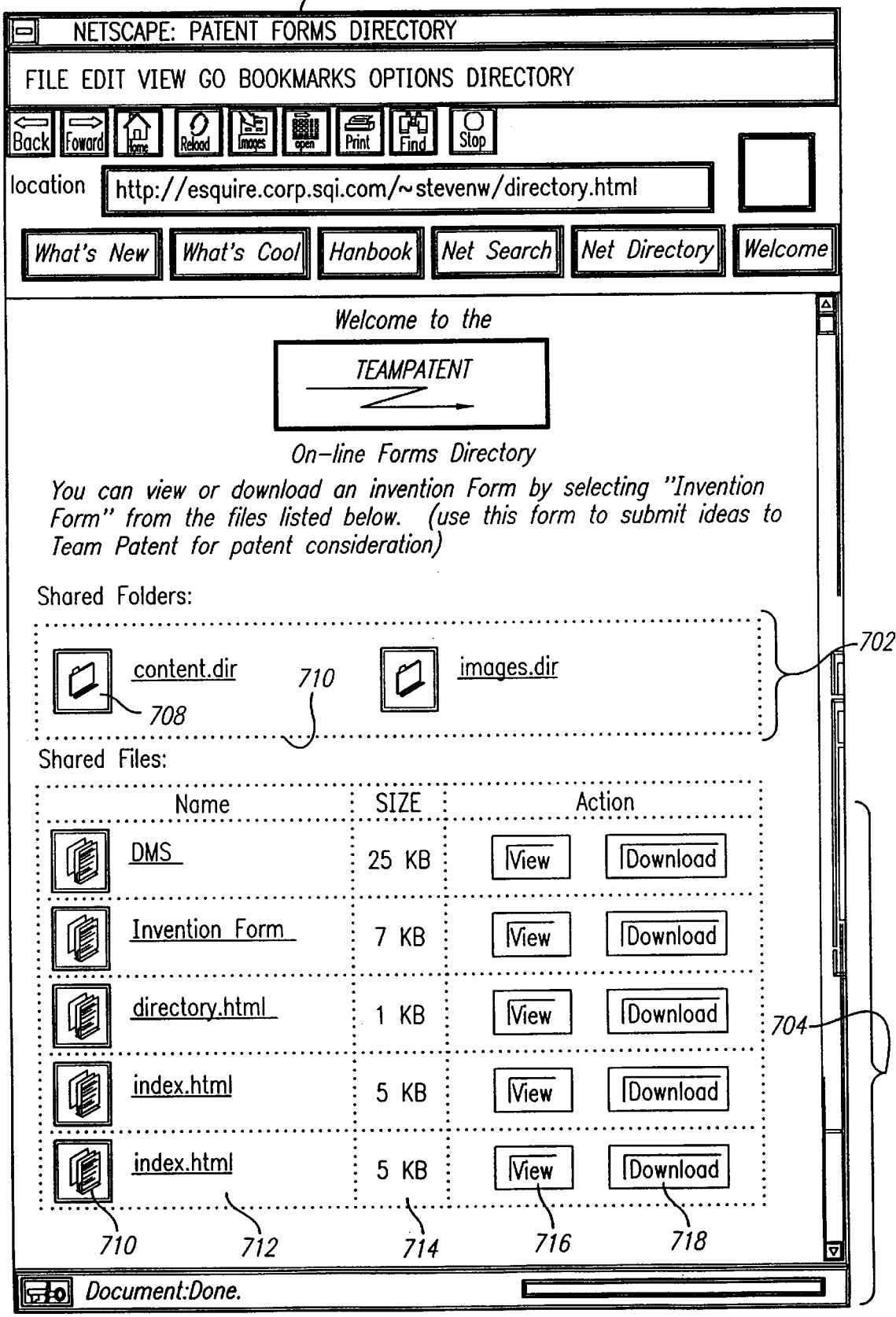
FIG. 10 shows a home page displayed in accordance with a preferred embodiment of the present invention, after the information of FIG. 9 has been added.

FIG. 10 shows an example of a home page 1000 displayed by browser 172. When server 170 creates HTML for page 1000, it creates the HTML corresponding to areas 702 and 704 in accordance with the files in public directory 178 of FIG. 9. A fifth file has been added to public directory 178 between FIG. 8 and FIG. 9. Thus, in FIG. 9, window 402 shows that public directory 178 contains five files and two sub-directories. The HTML generated for the user's home page reflects the contents of public directory 178. The two sub-directories are represented in area 702 of home page 1000 and the five files are represented in area 704 of home page 1000. Each sub-directory is represented as an icon 708 and a sub-directory name 710. Each file is represented as an icon 710, a filename 712, a size of the file 714, a "View" button 716, and a "Download" button 718.

A description of the functionality of various areas of home pages 700 and 1000 follows. A person of ordinary skill in the art will be able to create HTML yielding the described functionality based upon the discussion herein.

When a user selects a file icon 710, browser 172 sends a request 606 to server 170. Server 170 will respond 608 with the contents of the file. "View" button 710 causes the same effect (i.e., the server will send the contents of the file). If the file is a graphics file (e.g., a GIF file), browser 172 will display the graphics file. If the file contains animation, browser 172 will display the animation.

When a user selects the "Download" button 718, browser 172 sends a request 610 to server 170. Server 170 will download 612 the contents of the file into storage, as determined by the browser. In a preferred embodiment using the previously mentioned Netscape browser, the browser requests a file name home from the user for storage of downloaded file. The described embodiment of the present invention does not allow a browser user to download a directory. However, an alternate embodiment may allow downloading of a directory using known techniques which would be apparent to one of ordinary skill in the art based upon the present disclosure.

When the user selects a directory icon 708, browser 172 sends a request 614 to server 170 with a URL of a page for that directory (the HTML previously transmitted to the browser to create the home page contained the URL for the selected directory). Server 170 will download 616 a new page, similar to page 700. The new page will display icons for sub-directories and files in the selected directory, in a manner similar to that of FIG. 7.

Figure 11:
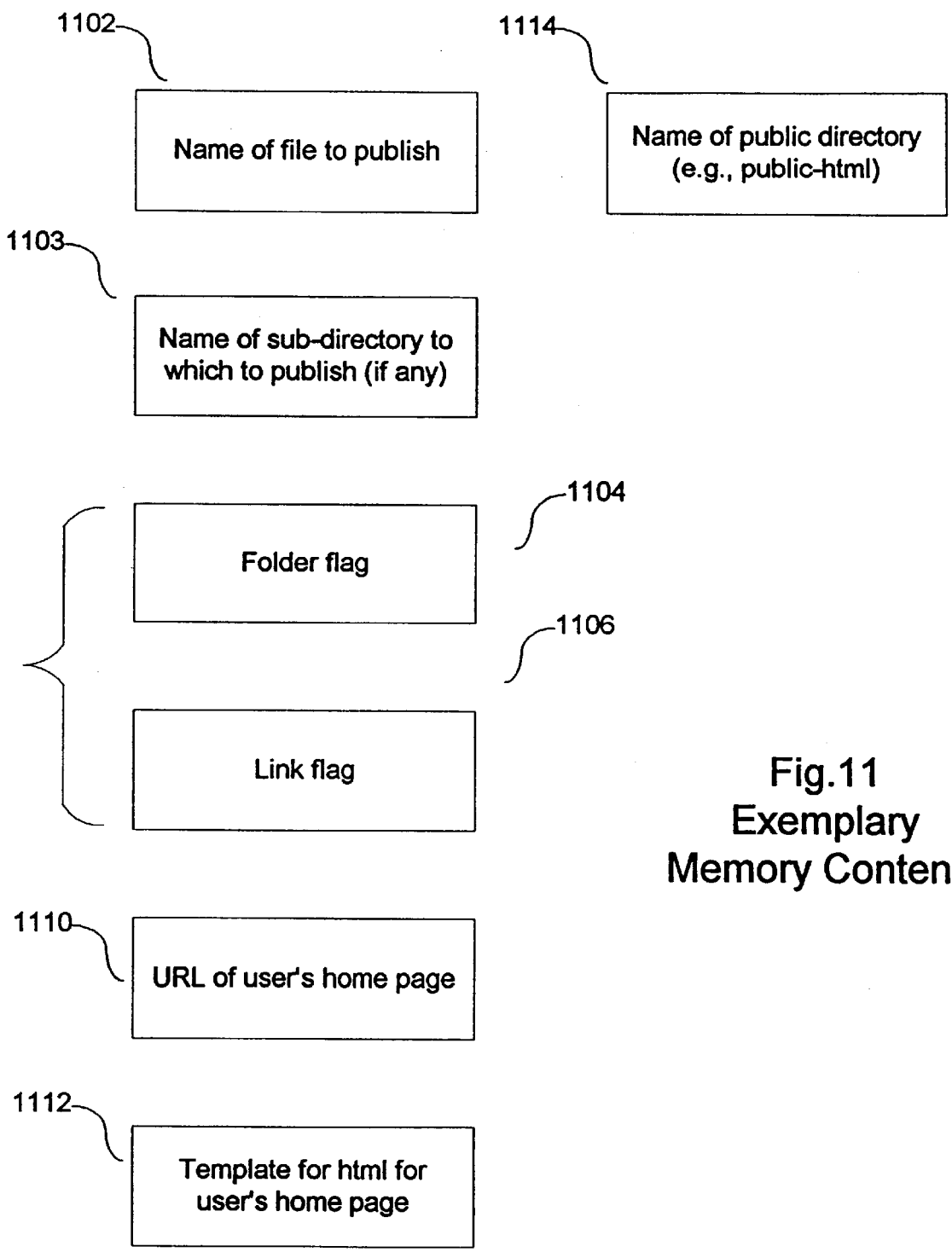
FIG. 11 shows contents of data structures stored in a memory of FIG. 1.

FIG. 11 shows contents of data structures stored in memory 104 of FIG. 1. These data structures include a name of a user-selected file to publish 1102, a name 1103 of a sub-directory to which to publish a file (if applicable), Folder flag 1104, Link flag 1106, the URL of the user's home page 1110, the location of HTML template 176, and the name 1114 of public directory 178.

Figure 12:
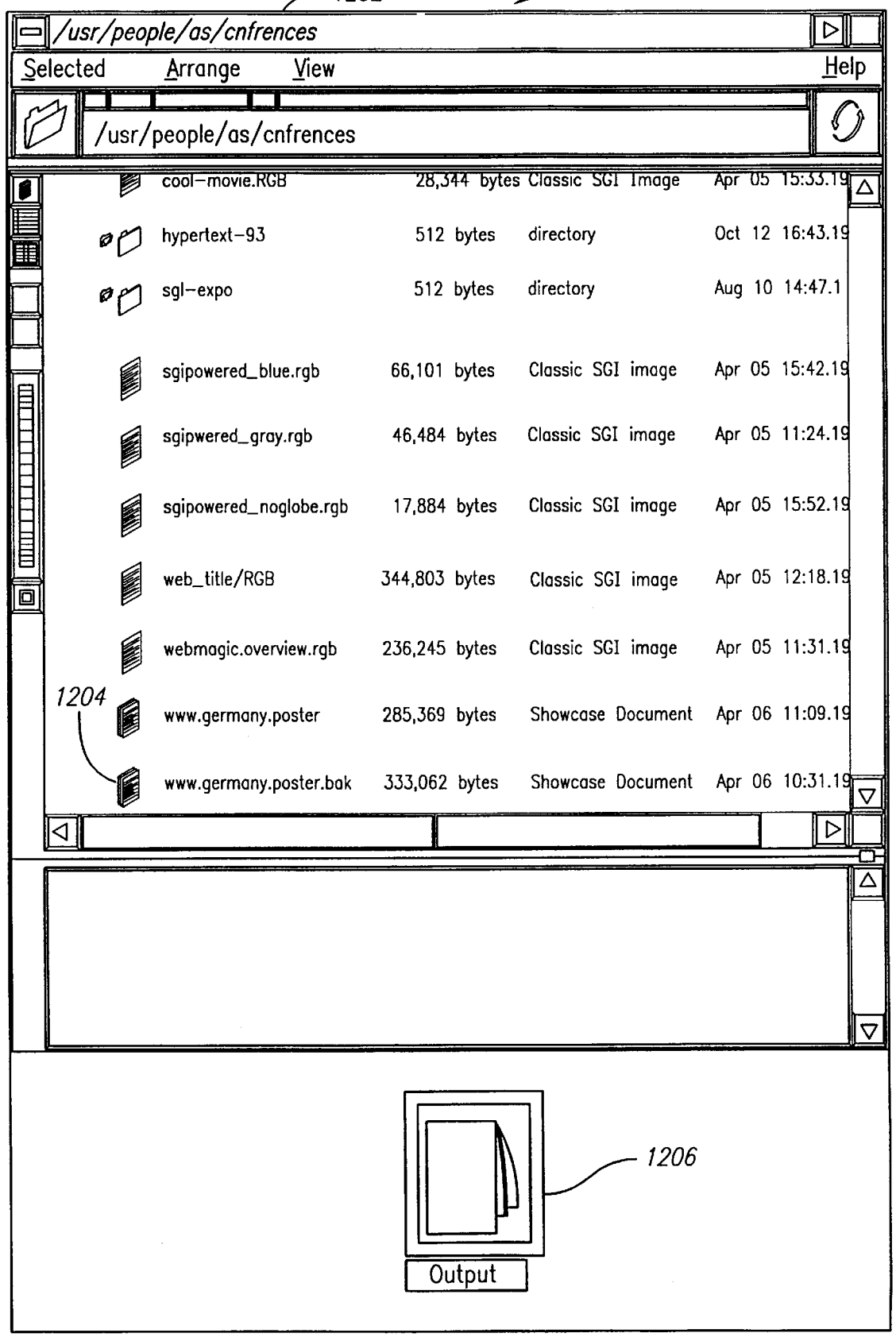
FIG. 12 shows a plurality of windows displayed prior to the initiation of the outbox software of FIG. 2.

FIG. 12 shows a window display prior to the initiation of the outbox software 174 of FIG. 2, and an icon 1206 for that software program. The window 1202 in the upper portion of FIG. 12 contains a list of files 1204 which a home page owner may wish to publish. The outbox icon 1206 is displayed near the bottom of the computer screen 1208.

Figure 13:
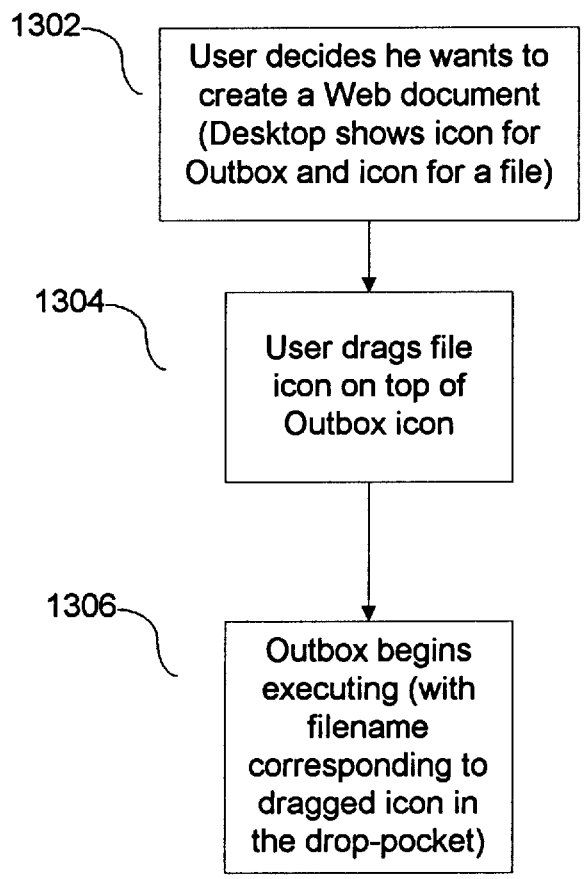
FIG. 13 is a flow chart showing alternate steps to publish information on a home page.

FIG. 13 is a flow chart showing alternate steps to allow a user to publish information on a home page. These steps are performed before the outbox software 174 is executed. In step 1302, the user decides that he wants to create or modify a Web document, such as his home page. At this point, the desktop display will show an icon 1206 for outbox software 174 and for at least one other file (e.g., file www.germany.poster) containing the information to be published. In step 1304, the home page owner drags and drops the file icon 1204 onto the icon 1206 for outbox 174. The operating system interprets this drag and drop operation as an instruction to execute outbox software 174. Thus, in step 1306, outbox software 174 begins executing the name of the file that corresponds to the dragged icon displayed in drop-pocket area 412. Thereafter, the display of FIG. 4 is displayed and the user may publish the file if he wishes by pointing and clicking on the "Publish" button 432, as previously explained.

In summary, in the present invention, the outbox software allows a user to create a home page and/or modify the contents of the home page. If a user wishes to add information to the home page, he creates a file containing the information and uses the outbox functionality to place it in his home page. The files to be published on the home page may be created using standard word processing software. Importantly, the outbox software performs certain automatic initialization steps, discussed above, that enable the server to locate the user's home page, without requiring the user to have any knowledge of how this is accomplished. The server creates HTML that displays icons for and names of all files and sub-directories in the public file. The user can click on an icon to view or download the contents of the corresponding file or directory.

Other embodiments will be apparent to those skilled in the art from consideration of the present specification, figures and claims, and practice of the invention disclosed herein. It is intended that the specification and examples be considered as exemplary only, with a true scope of the invention being indicated by the following claims.

What is claimed is:

1. A method for electronically publishing at least one currently existing document in a computer network environment, the network environment including at least one server and a display device, the method comprising the steps of:
   (a) generating a home page document template in a file system of the server;
   (b) detecting that a user has dragged and dropped at least one file icon, displayed on the computer display device and corresponding to the at least one currently existing document, onto a second icon displayed on the computer display device and representing a request to publish; and
   (c) in at least partial response to the detecting step, automatically creating a link to the at least one currently existing document in the home page document template and electronically publishing the at least one currently existing document.

2. The method of claim 1, further comprising the step of allowing the user to confirm the request to publish the at least one document prior to completing the publication of the at least one document.

3. The method of claim 2, wherein the confirming step includes the steps of:
   detecting that the user has clicked on a button displayed on the display device; and
   displaying a directory including the at least one document to be published.

4. The method of claim 1, wherein the step of generating a home page document template is performed automatically in response to a user request for creation of a home page, without the user specifying the contents of the home page document.

5. The method of claim 1, wherein the step of generating a home page document template further includes encoding information in the home page for accessing at least one file directory, and wherein the method further includes the step of using the encoded information to generate hypertextual links to at least one referenced file in the designated file directory.

6. The method of claim 1, wherein the second icon is a drop pocket icon for effecting the link to the at least one document.

7. The method of claim 6, wherein, prior to the step of detecting, the file icon is displayed in a first window on the display device and the drop pocket icon is displayed in a second window on the display device, and during the detecting step, the file icon is dragged from the first window to the second window.

8. The method of claim 1, wherein the second icon representing the request to publish is an icon also representing a directory in which documents to be published are stored.

9. The method of claim 8, wherein, prior to the step of detecting, the file icon is displayed in a first window on the display device and the second icon is displayed in a second window on the display device, and during the detecting step, the file icon is moved from the first window to the second window.

10. The method of claim 1, wherein the second icon representing the request to publish is an icon also representing a method for electronically publishing at least one document in a computer network environment.

11. A method for electronically publishing at least one currently existing document in a computer network environment, the network environment comprising at least one server and a display device, the method comprising the steps of:
   (a) generating a home page template in a file system of the server;
   (b) opening a first window on the display device, the window including therein an icon corresponding to the at least one currently existing document;
   (c) opening a second window on the display device;
   (d) detecting that a user has dragged the at least one document icon from the first window to the second window and dropped the icon in the second window; and
   (e) at least partly in response to the detecting step, automatically creating a link to the at least one document in the home page template and electronically publishing the at least one document.

12. The method of claim 11, further comprising the step of detecting that the user has dragged at least one additional icon representing another document from the first window to the second window and dropped the additional icon in the second window, and, at least partly in response to detection of dropping the second icon in the second window, automatically creating a link to the other document in the home page template.

13. The method of claim 11, wherein the detecting step includes detecting that the user has dropped the document icon on a second icon in the second window.

14. The method of claim 13, wherein the second icon is a drop pocket icon.

15. The method of claim 13, wherein the second icon is an icon representing a directory.

16. The method of claim 13, wherein the second icon is an icon representing a document publication application.

17. A computer program product, comprising:

a computer useable medium having computer readable code embodied therein for causing the publication of a selected currently existing document to a preconfigured home page template, the computer program product including:

computer readable program code devices configured to cause a computer to effect the generation of a home page template in computer memory; and computer readable program code devices configured to cause a computer to effect, in at least partial response to a drag and drop operation on an icon corresponding to the currently existing document, the inclusion of a hypertextual link between the document corresponding to by the icon and the home page template.

18. The computer program product of claim 17, further comprising computer program code devices configured to cause the computer to effect the display of a drop pocket for the target of the drag and drop operation.

19. The computer program product of claim 17, further comprising computer program code devices configured to cause the computer to effect the display of a file directory icon for the target of the drag and drop operation.

20. The computer program product of claim 17, further comprising computer program code devices configured to cause the computer to effect the display of an icon representing the computer program product as the target of the drag and drop operation.

* * * * *